United States Patent [19]
Lamm

[11] 3,820,798
[45] June 28, 1974

[54] SEALING BAR FOR A ROTARY PISTON INTERNAL COMBUSTION ENGINE

[75] Inventor: Heinz Lamm, Bernhardt, Germany

[73] Assignee: Daimler-Benz AG, Stuttgart-Unterurkheim, Germany

[22] Filed: Nov. 20, 1970

[21] Appl. No.: 91,365

[30] Foreign Application Priority Data
Nov. 21, 1969 Germany............................ 1958506
Feb. 24, 1970 Germany............................ 2008473

[52] U.S. Cl............................... 277/81 P, 418/179
[51] Int. Cl......................... F02b 55/02, F16j 15/08
[58] Field of Search................... 418/179, 113, 235; 277/235, 237, 81 P, 58, 224, DIG. 6, 81

[56] References Cited
UNITED STATES PATENTS
2,798,005  7/1957  Love............................. 277/DIG. 6
FOREIGN PATENTS OR APPLICATIONS
1,386,016  12/1964  France............................ 277/81 R

*Primary Examiner*—Louis R. Prince
*Assistant Examiner*—Robert L. Smith
*Attorney, Agent, or Firm*—Craig and Antonelli

[57] ABSTRACT

A sealing bar for a rotary piston internal combustion engine, especially of trochoidal construction which is arranged movable in the radial direction within a piston groove and which sealingly slides with its crest portion along an engaging surface provided in the housing casing of the internal combustion engine, whereby the flanks of the sealing bar are provided either entirely or partly with separate sliding elements which in conjunction with the material of the piston result in small friction values; small recesses may additionally be provided in the flanks of the sealing bar within the area of the sliding element for the accommodation of a connecting material for the sliding element with the sealing bar.

6 Claims, 10 Drawing Figures

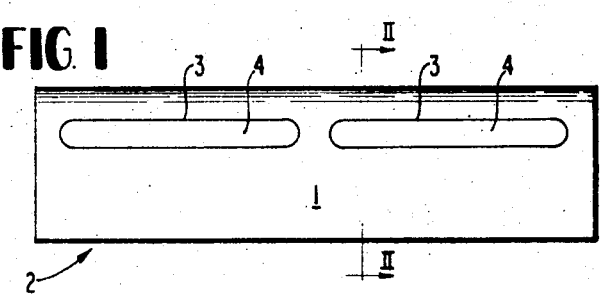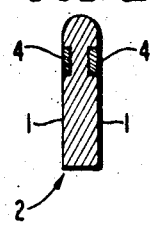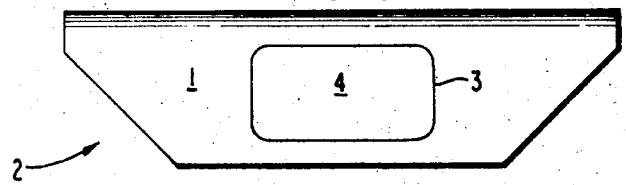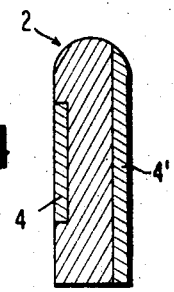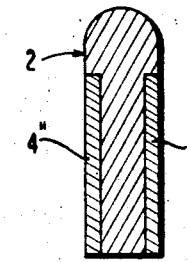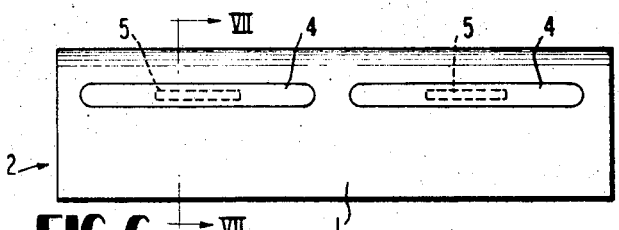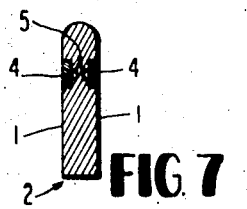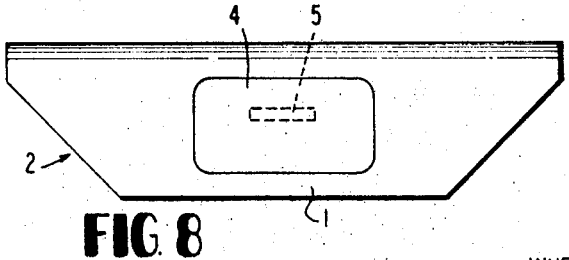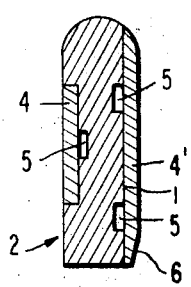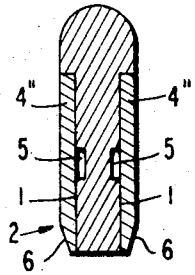

SEALING BAR FOR A ROTARY PISTON INTERNAL COMBUSTION ENGINE

The present invention relates to a sealing bar for a rotary piston internal combustion engine especially of trochoidal-type of construction, which is arranged in a piston groove movable in a radial direction and which slides with its head portion sealingly along an engaging surface in the housing casing of the internal combustion engine.

The material of the engaging surface of the casing and of the sealing bar is decisive for a small wear of the head portion of a sealing bar. Both materials must possess good sliding properties with respect to one another. The sealing bar material is determined with a given engaging surface of the casing, which material, on the other hand, again must exhibit good sliding properties with respect to the piston groove. However, the piston material can be varied only with narrow limits, for it has to be determined more or less for reasons of technological casting considerations or technological welding considerations and for reasons of its rigidity. As a result thereof, not always the most favorable sliding properties are attained between the piston and the sealing bar.

Chatter marks result with the occurrence of frictional vibrations of the head portion of the sealing bar on the engaging surface of the casing, which influence unfavorably the gas tightness, especially at low rotational speed. A sealing bar poorly sliding in the piston groove assists this negative effect. The sealing bar cants and jams and follows only hesitatingly the prescribed movement course. Leakages occur as a result thereof. An over-blowing takes place from the chamber side with higher pressure into the lower pressure side. The sealing bar heats up strongly. The lubricating film is destroyed and the entire seal from chamber to chamber is jeopardized. The wear at the head portion of the sealing bar increases.

Improvements can be realized within a limited framework by a costly machining along the sealing bar and along the piston groove and also by an improved lubrication and by application of smallest tolerances and clearances. However, these measures are possible for a series manufacture only with large expenditures and high costs.

The present invention is concerned with the task to so construct a sealing bar with slight expenditures that favorable sliding conditions in the piston groove are attained and larger manufacturing tolerances can be permitted.

The underlying problems are solved according to the present invention in that the flanks of the sealing bar are provided either entirely or partially with separate sliding elements which in conjunction with the material of the piston produce small friction values, for example, sliding elements made from conventional ceramic oxide materials, from impregnated carbon, from molybdenum, from sintered materials, from hard metals or the like, in which additional solid lubricating particles may possibly be embedded.

It is achieved by the present invention that no jamming or canting of the sealing bar takes place in the piston groove. The wear at the head portion of the sealing bar remains small. The chatter-mark formation becomes smaller at the engaging surfaces of the casing. No over-blowing takes place at the sealing bar head portion. The sealing bar no longer heats up so that a destruction of the lubricating film does not take place. Wear traces at the flanks of the sealing bar are avoided. The piston groove no longer flattens or opens out. The application of a smaller sealing bar clearance becomes possible. The gas tightness from chamber to chamber is increased. Also, smaller idling rotational speeds can be adjusted.

In an advantageous construction of the subject matter of the present invention, the sliding elements may be glued or bonded into corresponding recesses or apertures, may be soldered or brazed-in, may be welded on, or may be connected with the sealing bar by sintering. However, the sliding elements may also be merely inserted into corresponding recesses. Furthermore, it is possible to manufacture the sliding parts by spraying (metallizing), welding, evaporation, or by a galvanic process of conventional type.

Additionally, the present invention is concerned with a further improved construction of the sealing bars of the type described above. More particularly, the fixing of the sliding parts in the aperture provided therefor within the flanks of the sealing bars is improved in that small recesses are provided within the area of the sliding elements in the flanks of the sealing bar for the accommodation of a connecting material of the sliding elements with the sealing bar. If the sliding elements are merely inserted into the apertures, the recesses receive liquid, for example, oil, gasoline, or also a mixture whereby the wetting and, consequently, also the mutual adherence of the parts is increased. It is achieved in this manner that the entire flank of the sealing bar more closely approaches a continuous plane which, in turn, has as a result an increased gas tightness. It is further to be considered advantageous that as a result of the sliding adherence no stresses can occur between the parts. If the sliding elements are rigidly connected with the sealing bar, then the connecting material may be advantageously received by the recesses without impairing a smooth abutment of the sliding elements.

In an advantageous construction of the present invention, the length of the small recesses underneath the sliding elements, as seen in the direction of the longitudinal axis of the sealing bar, may correspond at least to about one-third of the length of the associated sliding element, without attaining the full length thereof, and its height may be relatively slight compared to the height of the sliding element. As a result of the play or clearance of both parts, liquid is continuously pumped through and replenished during the operation. The recesses may also receive slight quantities of dirt and contaminations. Furthermore, a temporary point of adherence that again dissolves by heat during operation, may be provided at the place which serves for the elastic fixing of the parts during machining and assembly.

Additionally, for the better stabilization and fixing of sliding elements, which are constructed of larger height, several parallel recesses may be arranged one above the other.

Accordingly, it is an object of the present invention to provide a sealing bar for a rotary piston internal combustion engine, particularly of trochoidal construction, which avoids by simple means the aforementioned shortcomings and drawbacks encountered in the prior art.

Another object of the present invention resides in a sealing bar of the type described above which permits the realization of extraordinary favorable sliding properties between the various parts under consideration.

A further object of the present invention resides in a sealing bar for rotary piston internal combustion engines which increases the gas tightness and at the same time permits lower idling rotational speeds.

Another object of the present invention resides in a sealing bar of the type described above which precludes a jamming or canting of the sealing bar in the piston groove while at the same time reducing the wear at the peak or head portion of the sealing bar.

Still a further object of the present invention resides in a sealing bar for rotary piston internal combustion engines which reduces the chatter-mark formation at the engaging surfaces of the casing, minimizes the danger of heating up of the sealing bar and thus reduces the danger of impairment of the lubricating film.

Another object of the present invention resides in a sealing bar for a rotary piston internal combustion engine in which the fixing of the sliding parts in the apertures provided in the flanks of the sealing bar is greatly improved while at the same time facilitating assembly and machining of the parts.

These and further objects, features, and advantages of the present invention will become more obvious from the following description when taken in connection with the accompanying drawing which shows, for purposes of illustration only, several embodiments in accordance with the present invention and wherein:

FIG. 1 is an elevational view of a sealing bar in accordance with the present invention FIG. 2 is a cross-sectional view through the sealing bar of FIG. 1, taken along lines II—II of FIG. 1;

FIG. 3 is an elevational view, on an enlarged scale, of a modified embodiment of a sealing bar in accordance with the present invention;

FIG. 4 is a cross-sectional view, similar to FIG. 2, on an enlarged scale, illustrating still another modified embodiment of a sealing bar in accordance with the present invention;

FIG. 5 is a transverse cross-sectional view, similar to FIG. 4, of a still further modified embodiment in accordance with the present invention;

FIG. 6 is an elevational view, similar to FIG. 1, of a still further modified embodiment of a sealing bar, in accordance with the present invention;

FIG. 7 is a transverse cross-sectional view of the sealing bar illustrated in FIG. 6, taken along line VII—VII of FIG. 5;

FIG. 8 is an elevational view of a further modified embodiment of a sealing bar, similar to FIG. 3; and FIGS. 9 and 10 are cross-sectional views, similar to FIG. 7, on an enlarged scale, and illustrating two further modified embodiments of a sealing bar in accordance with the present invention.

Referring now to the drawing wherein like reference numerals are used throughout the various views to designate like parts, and more particularly to FIGS. 1 and 2, recesses 3 are provided in the flanks 1 of the sealing bar generally designated by reference numeral 2, into which are inserted the sliding elements 4. The recesses or apertures 3 and therewith the sliding elements 4 are arranged within areas of the flanks 1 where the largest stress or load occurs. The sliding elements 4 consist, for example, of ceramic oxides, of impregnated carbon, of molybdenum, of armor-plating (steel cladding) material such as, for example, stellite. Possibly solid lubricating particles are embedded in these sliding elements 4. A connection with the sealing bar 2 takes place by bonding, gluing, soldering, welding or sintering. Possibly the sliding elements 4 may also be inserted merely loosely into the apertures or recesses 3 whereby the sliding element 4 naturally have to be ground together with the sealing bar 2 to the same thickness.

Whereas in the case of the embodiment according to FIGS. 1 and 2, two sliding elements 4 are arranged in each groove flank 1, in the embodiment according to FIG. 3, which illustrates the center part of a conventional three-partite sealing bar, only one sliding element 4 is arranged in each flank 1 in a corresponding recess or aperture 3.

FIG. 4 illustrates that one sliding element 4' at one flank of the sealing bar 2 may also extend over the entire height of the sealing bar. It is also possible according to FIG. 5 to let the sliding elements 4" start from the base of the sealing bar and to terminate the same below the peak or head portion of the sealing bar 2.

In FIGS. 6 and 7, small recesses 5 are provided underneath the sliding elements 4 in the flanks 1 of the sealing bar 2 equipped with sliding elements 4, which recesses 5 serve for the accommodation of a connecting material of the sliding elements 4 with the sealing bar 2. The length and the height of these recesses 5 correspond in each case to about one-third of the length or height, respectively, of the associated sliding element 4.

Whereas in the embodiment according to FIGS. 6 and 7, two sliding elements 4 are arranged in each flank 1, in the embodiment according to FIG. 8, which again represents the center part of a conventional three-partite sealing bar 2, only one sliding element 4 is arranged in each flank 1. One recess 5 is disposed underneath each sliding element 4 of this embodiment, which has about a third of the length of the sliding element 4 and whose height is relatively slight compared to the height of the sliding element 4.

FIG. 9 illustrates a sealing bar cross-section with two sliding elements 4 and 4' whereby the sliding element 4' of one flank 1 extends over the entire height of the sealing bar 2; two recesses 5 are provided in the flank 1 underneath this sliding element 4' which are disposed one above the other, whereas only one recess 5 is disposed underneath the oppositely disposed smaller sliding element 4 approximately at half of its height.

According to FIG. 10, sliding elements 4" which begin at the base of the sealing bar 2 but terminate below the head portion of the sealing bar 2, are inserted into the flanks 1 with one recess 5 each arranged underneath the same approximately at half the height thereof.

In order that the sliding element 4, 4', or 4" is not lifted off from the base of the associated recess 3 by the pressure in case of a slight tilting of the sealing bar 2 in its groove, which pressure is exerted by the groove flank on the lower edge thereof, the sliding element is provided at the lower end according to FIGS. 9 and 10 with a bevel or chamfer 6. A lifting-off might lead to the breakage of the sliding element 4 consisting preferably of brittle material or might lead to a damage of its corners; gases might reach behind or underneath the sliding element 4, 4', or 4" and thus destroy the adherence thereof of the sealing bar 2.

While I have shown and described several embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

What I claim is:

1. A sealing bar for use with a rotary piston machine with said sealing bar movable within a piston groove in a radial direction of a rotatable piston; said sealing bar comprising:

a first part constructed of a first material and including a head portion sealingly and slidably engageable with an engaging surface of a casing housing of said machine, said first part including a pair of oppositely facing side flanks for slidably engaging respective groove walls of said piston groove, each of said flanks including a pair of aligned recesses which are spaced from one another in a longitudinal direction which is transverse to said radial direction, each of said recesses having a dimension in said radial direction substantially smaller than the dimension thereof in the longitudinal direction and substantially smaller than the dimension of said first part in the radial direction, and a plurality of sliding elements positioned and fastened one each in the respective recesses of said side flanks with peripheral edges of the recesses abuttingly engaging respective peripheral edges of the sliding elements to prevent relative movement of said sliding elements and said first part in both the radial and longitudinal directions, all radially and longitudinally facing peripheral edges of said sliding elements being in facing abutting engagement with corresponding edges of respective ones of said recesses, said recesses and sliding elements accommodated therein being spaced radially inwardly from said head portion such that said sliding elements slidably engage said groove walls while being out of engagement with said engaging surface of said casing housing at all times, said sliding elements being constructed of a second material different from said first material such that optimal sealing engagement of said head portion and said engaging surface as well as optimal sliding engagement of the flanks in said piston groove can be obtained by utilization of said different materials in the sealing bar.

2. A sealing bar according to claim 1, wherein solid lubricating particles are embedded in the material from which the sliding elements are made.

3. A sealing bar according to claim 1, wherein said second material is a ceramic oxide.

4. A sealing bar according to claim 1, wherein said second material is impregnated carbon.

5. A sealing bar according to claim 1, wherein said second material is molybdenum.

6. A sealing bar according to claim 1, wherein said second material is stellite.

* * * * *